United States Patent [19]

Yeh

[11] Patent Number: 5,449,567

[45] Date of Patent: Sep. 12, 1995

[54] RECHARGEABLE BATTERY

[76] Inventor: Tsun-Wan Yeh, 3F, No. 149, Nan-Ta Rd., Hsin-Chu City, Taiwan

[21] Appl. No.: 334,117

[22] Filed: Nov. 4, 1994

[51] Int. Cl.[6] .......................................... H01M 10/46
[52] U.S. Cl. ........................................ 429/7; 429/9; 429/53; 429/98; 320/2; 320/3; 320/4
[58] Field of Search ............... 429/7, 9, 53, 49, 98; 320/2, 3, 4, 5

[56] References Cited

U.S. PATENT DOCUMENTS

| | | |
|---|---|---|
| 3,013,198 | 12/1961 | Witte et al. |
| 4,086,523 | 4/1978 | Izumi |
| 4,622,507 | 11/1986 | Persen |
| 4,794,315 | 12/1988 | Pederson et al. ............... 320/2 |
| 5,057,381 | 10/1991 | Persen |

Primary Examiner—Stephen Kalafut
Assistant Examiner—Richard H. Lilley, Jr.
Attorney, Agent, or Firm—Cushman Darby & Cushman

[57] ABSTRACT

A rechargeable battery includes a hollow battery housing having a top end provided with a positive battery terminal, a bottom end provided with a negative battery terminal, and a surrounding wall that confines a cell receiving space and a prong receiving space. A prong unit includes a prong base disposed slidably in the prong receiving space, a pair of prongs connected at one end to the prong base, and a slide button extending through a longitudinal slot in the surrounding wall of the battery housing and connected to the prong base. The slide button is operable manually to move the prongs selectively between a first position, wherein the prongs are fully retracted in the prong receiving space, and a second position, wherein the prongs extend out of the prong receiving space via prong holes at the top end of the battery housing for connection to an electrical outlet. A secondary storage cell is received in the cell receiving space and has a positive cell terminal connected electrically to the positive battery terminal and a negative cell terminal connected electrically to the negative battery terminal. A charging circuit unit is disposed in the cell receiving space and interconnects electrically the prongs and the positive and negative battery terminals to permit charging of the secondary storage cell when the prongs are connected to the electrical outlet.

19 Claims, 6 Drawing Sheets

RECHARGEABLE BATTERY

BACKGROUND OF THE INVENTION

1. Field of the Invention

The invention relates to a rechargeable battery, more particularly to a rechargeable battery which includes a secondary storage cell and a charging circuit unit for charging the secondary storage cell.

2. Description of the Related Art Rechargeable batteries which are provided with prongs for connecting the battery to an electrical outlet in order to commence charging are known in the art. Examples of such rechargeable batteries have been disclosed in U.S. Pat. Nos. 3,013,198, 4,086,523, 4,622,507 and 5,057,381. These batteries incorporate different means for covering or retracting the prongs when the batteries are used to supply power to a battery-operated device.

SUMMARY OF THE INVENTION

The object of the present invention is to provide a rechargeable battery with a retractable prong-and-housing arrangement which can be easily and conveniently assembled.

Another object of the present invention is to provide a rechargeable battery which is capable of generating a visual signal when charging of the secondary storage cell is taking place.

Still another object of he present invention is to provide a rechargeable battery which is capable of generating a visual signal when the secondary storage cell has been fully charged.

A further object of the present invention is to provide a rechargeable battery with a charging circuit unit that has a simple construction.

Accordingly, the rechargeable battery of the present invention comprises a hollow battery housing, a prong unit, a secondary storage cell and a charging circuit unit.

The battery housing has a top end provided with a positive battery terminal and a bottom end provided with a negative battery terminal. The battery housing further has a surrounding wall that confines a receiving space, and a longitudinally extending partition wall that divides the receiving space into a cell receiving space and a prong receiving space. The top end of the battery housing is formed with a pair of prong holes. The surrounding wall is formed with a longitudinally extending slot. The prong holes and the slot permit access into the prong receiving space.

The prong unit includes a prong base disposed slidably in the prong receiving space, a pair of prongs connected at one end to the prong base, and a slide button extending through the slot in the surrounding wall and connected to the prong base. The slide button is operable manually to move the prongs selectively between a first position, wherein the prongs are fully retracted in the prong receiving space, and a second position, wherein the prongs extend out of the prong receiving space via the prong holes for connection to an electrical outlet.

The secondary storage cell is received in the cell receiving space and has a positive cell terminal connected electrically to the positive battery terminal and a negative cell terminal connected electrically to the negative battery terminal.

The charging circuit unit is disposed in the cell receiving space. The charging circuit unit interconnects electrically the prongs and the positive and negative battery terminals to permit charging of the secondary storage cell when the prongs are connected to the electrical outlet.

The partition wall has a longitudinal wall section with a top end, a bottom end and opposite longitudinal edges. The battery housing includes a main housing part with top and bottom ends and a peripheral wall. The top end of the main housing part has the positive battery terminal provided thereat. The bottom end of the main housing part constitutes the bottom end of the battery housing. The top end and the longitudinal edges of the longitudinal wall section of the partition wall are connected integrally and respectively to the top end and the peripheral wall of the main housing part. The partition wall further has a transverse wall section that extends from the bottom end of the longitudinal wall section and that is connected integrally to the peripheral wall of the main housing part. The main housing part and the partition wall cooperatively confine the cell receiving space. The battery housing further has a second housing part which cooperates with the partition wall to confine the prong receiving space. The second housing part has a horizontal section that engages the top end of the main housing part and that has the prong holes formed therethrough and a vertical section that has the slot formed therethrough. The horizontal section of the second housing part and the top end of the main housing part constitute the top end of the battery housing. The vertical section of the second housing part and the peripheral wall of the main housing part constitute the surrounding wall of the battery housing.

The charging circuit unit comprises a rectifier circuit which is connected electrically to the prongs and which generates a rectified output when the prongs are connected to the electrical outlet, a switch unit which interconnects the rectifier circuit and the positive and negative battery terminals to enable the rectifier circuit to charge the secondary storage cell, and a switch control circuit which is Connected to the rectifier circuit and the switch unit. The switch control circuit disables the switch unit when the rectified output exceeds a predetermined value to terminate charging of the secondary storage cell.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are indicated by the same reference numerals throughout the disclosure.

Figure 1:
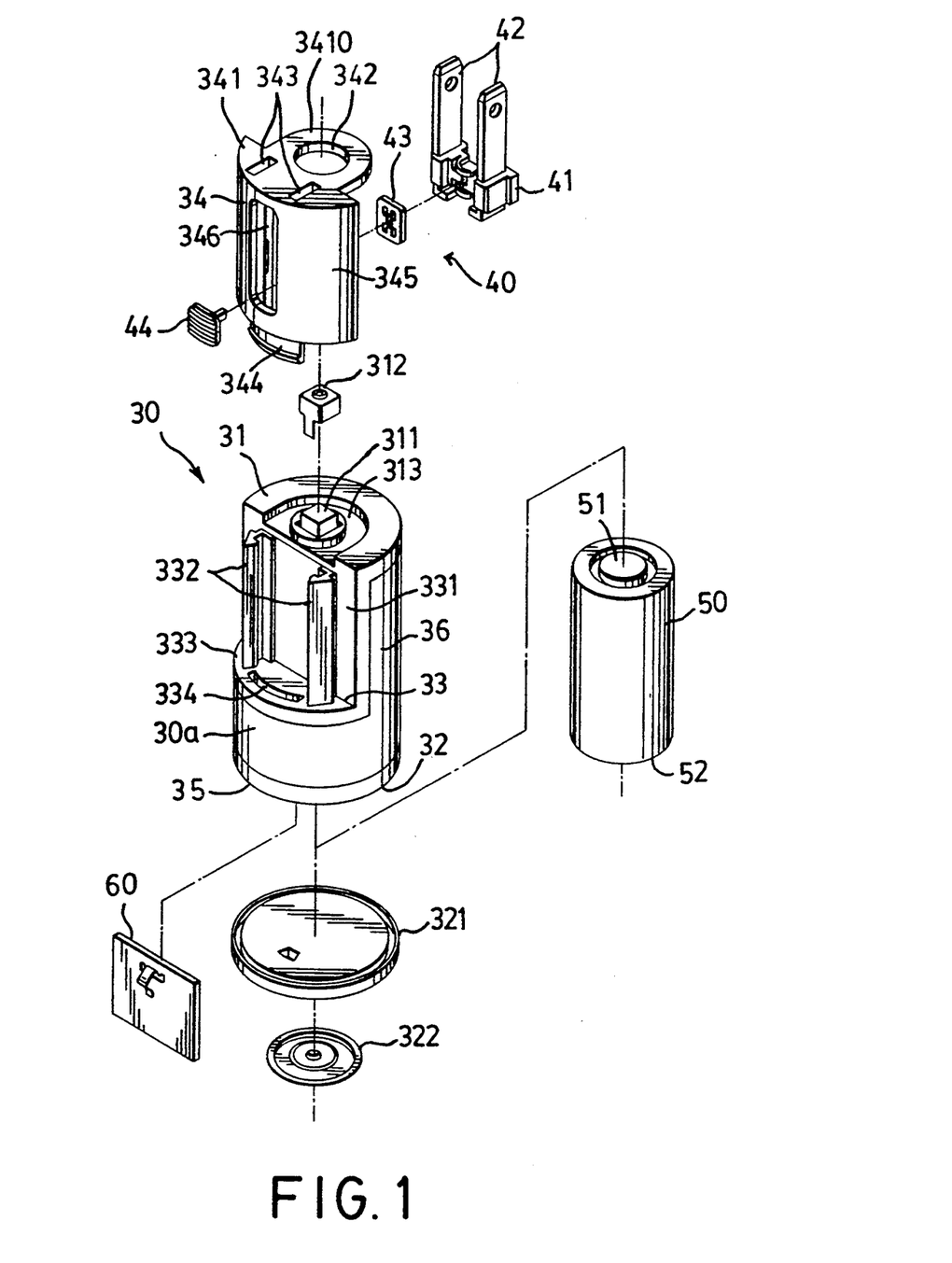
FIG. 1 is an exploded view of the first preferred embodiment of a rechargeable battery according to the present invention.

Referring to FIG. 1, the first preferred embodiment of a rechargeable battery according to the present invention is shown to comprise a hollow battery housing 30, a prong unit 40, a secondary storage cell 50 and a charging circuit unit 60.

The battery housing 30 is in the form of a standard cylindrical battery configuration and includes complementary main and second housing parts 30a, 34, and a longitudinally extending partition wall 33 which divides the receiving space confined by a surrounding wall of the battery housing 30 into a cell receiving space 35 and a prong receiving space.

The main housing part 30a has a closed top end 31 and an open bottom end 32. A bottom cover 321 is secured to the bottom end 32. A positive terminal seat 311 projects upwardly and axially from the top end 31 and has a conductive terminal cap 312 which is secured thereon and which serves as a positive battery terminal of the battery housing 30. The top end 31 further has a top surface that is formed with a U-shaped retaining groove 313 around the positive terminal seat 311. A conductive negative terminal plate 322 is secured to a bottom surface of the bottom cover 321 and serves as a negative battery terminal of the battery housing.

The partition wall 33 has a longitudinal wall section 331 with a top end, a bottom end and opposite longitudinal edges. The top end and the longitudinal edges of the longitudinal wall section 331 of the partition wall 33 are connected integrally and respectively to the top end 31 and the peripheral wall 36 of the main housing part 30a. The longitudinal wall section 331 is transverse to the top end 31 and is formed with a spaced pair of longitudinally extending guide rails 332. The partition wall 33 further has a transverse wall section 333 that extends from the bottom end of the longitudinal wall section 331 and that is connected integrally to the peripheral wall 36 of the main housing part 30a. The transverse wall section 333 is parallel to the top end 31 of the main housing part 30a and is formed with a curved retaining slot 334. The main housing part 30a and the partition wall 33 cooperatively confine the cell receiving space 35.

The second housing part 34 cooperates with the partition wall 33 to confine the prong receiving space. The second housing part 34 has a horizontal section 341 that engages the top end 31 of the main housing part 30a and that has a pair of prong holes 343 formed therethrough, and a vertical section 345 that has a longitudinally extending slot 346 formed therethrough. The prong holes 343 and the slot 346 permit access into the prong receiving space. The horizontal section 341 of the second housing part 34 has a retaining portion 3410 received in the retaining groove 313 at the top end 31 of the main housing part 30a and formed with a through-hole 342 to permit passage of the positive terminal seat 311 therethrough. The vertical section 345 of the second housing part 34 has a curvature which complements that of the peripheral wall 36 of the main housing part 30a and is formed with a downwardly extending retaining plate 344 which engages the retaining slot 334 at the transverse wall section 333 of the partition wall 33 to connect the second housing part 34 to the main housing part 30a. The horizontal section 341 of the second housing part 34 and the top end 31 of the main housing part 30a constitute the top end of the battery housing 30. The vertical section 345 of the second housing part 34 and the peripheral wall 36 of the main housing part 30a constitute the surrounding wall of the battery housing 30.

Figure 2:
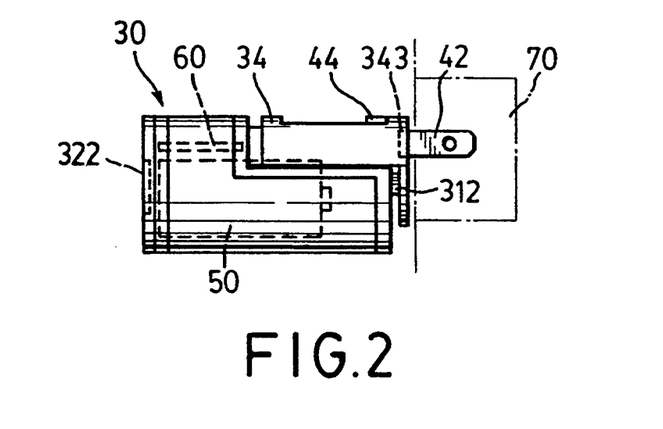
FIG. 2 illustrates the first preferred embodiment when connected to an electrical outlet.

The prong unit 40 includes a prong base 41 disposed slidably in the prong receiving space, a pair of prongs 42 connected at one end to the prong base 41, a mounting plate 43 secured on the prong base 41 adjacent the slot 346 in the second housing part 34, and a slide button 44 extending through the slot 346 and connected to the mounting plate 43. The prong base 41 has two ends engaging slidably the guide rails 332. The slide button 44 is operable manually to move the prongs 42 selectively between a first position, wherein the prongs 42 are fully retracted in the prong receiving space, and a second position, wherein the prongs 42 extend out of the prong receiving space via the prong holes 343 at the horizontal section 341 of the second housing part 34 for connection to an electrical outlet 70, as shown in FIG. 2.

The secondary storage cell 50 is received in the cell receiving space 35 and has a positive cell terminal 51 connected electrically to the conductive terminal cap 312 and a negative cell terminal 52 connected electrically to the negative terminal plate 322.

The charging circuit unit 60 is disposed in the cell receiving space 35 and interconnects electrically the prongs 42 and the conductive terminal cap 312 and the negative terminal plate 322 to permit charging of the secondary storage cell 50 when the prongs 42 are connected to the electrical outlet 70.

Preferably, the second housing part 34 is slidable in a longitudinal direction relative to the main housing part 30a to enable the horizontal section 341 to selectively conceal the conductive terminal cap 312 when it is desired to connect the prongs 42 to the electrical outlet 70.

Figure 3:
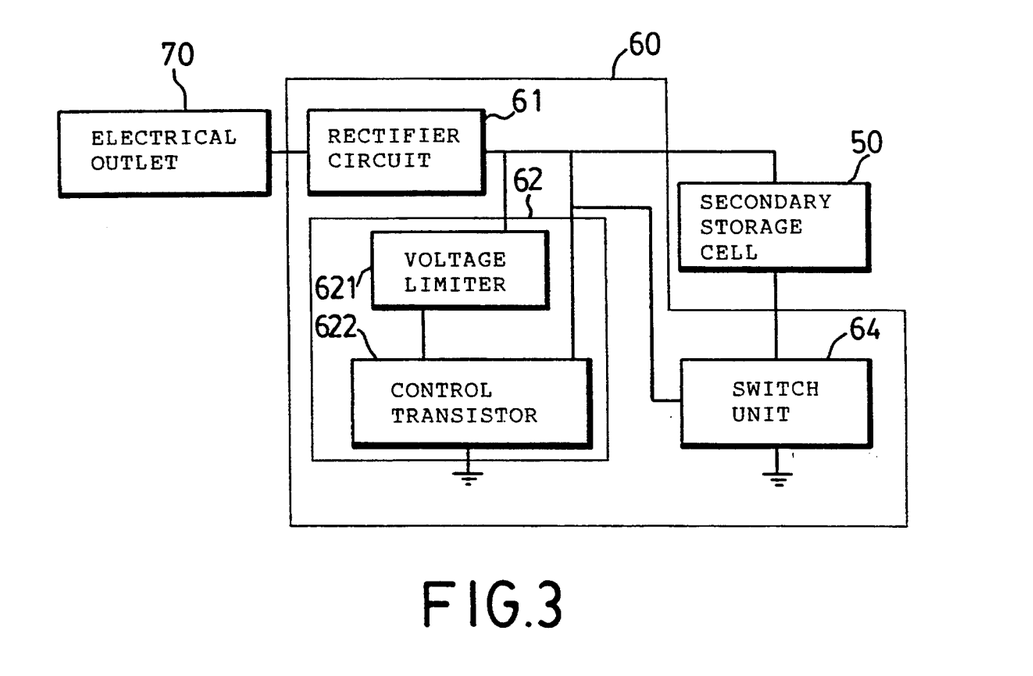
FIG. 3 is a schematic circuit block diagram of a charging circuit unit of the first preferred embodiment.

Referring to FIG. 3, the charging circuit unit 60 comprises a rectifier circuit 61, a switch control circuit 62 and a switch unit 64.

Figure 4:
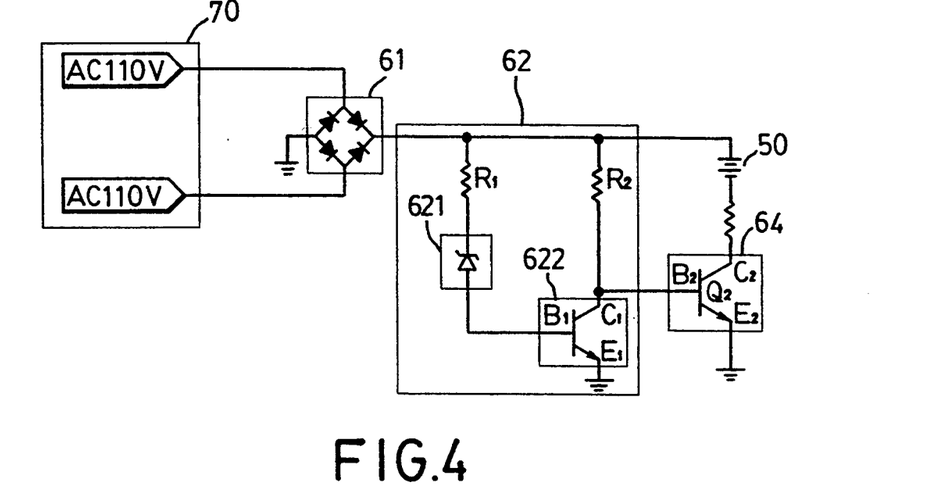
FIG. 4 is a schematic electrical circuit diagram of the charging circuit unit shown in FIG. 3.

Referring to FIG. 4, the rectifier circuit 61 is a diode bridge rectifier which is connected electrically to the prongs 42 and which generates a full-wave rectified output when the prongs 42 are connected to the electrical outlet 70. The switch unit 64 includes a switching transistor Q2 which interconnects the rectifier circuit 61 and the conductive terminal cap 312 and the negative terminal plate 322, thereby enabling the rectifier circuit 61 to charge the secondary storage cell 50. The switch control circuit 62 is connected to the rectifier circuit 61 and the switch unit 64, and serves to disable the switching transistor Q2 When the rectified output of the rectifier circuit 61 exceeds a predetermined value, such as 12 volts, to terminate charging of the secondary storage cell 50.

The switch control circuit 62 comprises a control transistor 622 having collector and emitter terminals connected to base and emitter terminals of the switching transistor Q2, and a voltage limiter 621 interconnecting the rectifier circuit 61 and a base terminal of the control transistor 622. In this embodiment, the voltage limiter 621 is a zener diode.

In operation, when the rectified output of the rectifier circuit 61 is below the predetermined value, the voltage limiter 621 does not conduct, and the control transistor 622 is in a cut-off mode. The switching transistor Q2 conducts to permit charging of the secondary storage cell 50. When the rectified output of the rectifier circuit 61 exceeds the predetermined value, the voltage limiter 621 conducts to cause the control transistor 622 to conduct correspondingly. At this stage, the collector-emitter voltage across the control transistor 622 is insufficient to bias the switching transistor Q2 in a conducting mode, thereby disabling the switching transistor Q2 to interrupt charging of the secondary storage cell 50. Thus, damage to the secondary storage cell 50 due to the presence of excessively high voltages can be prevented.

Figure 5:
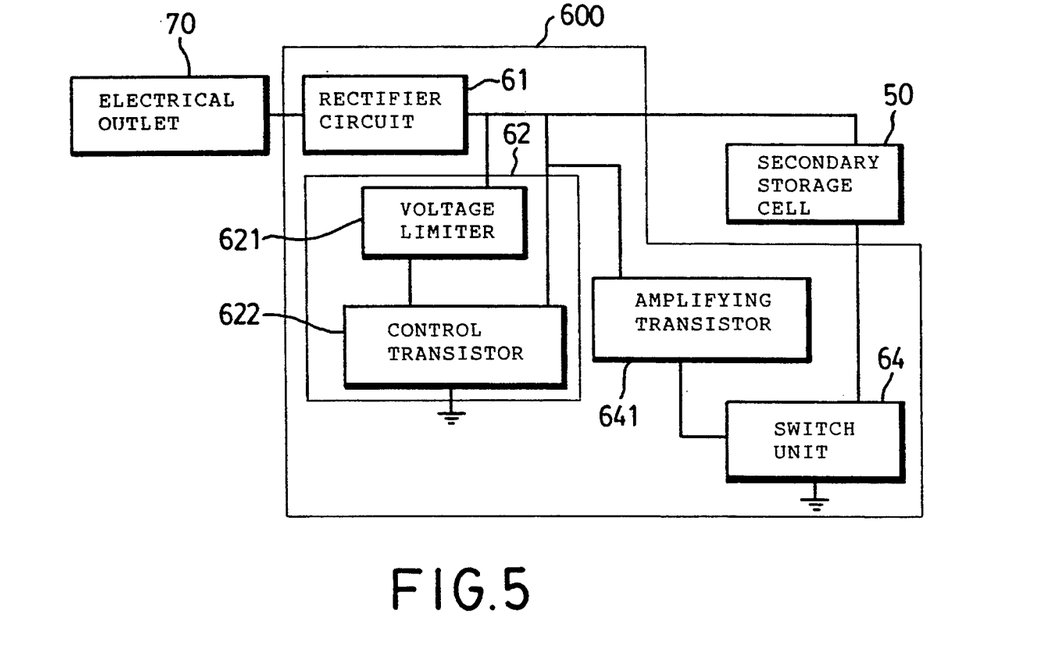
FIG. 5 is a schematic circuit block diagram of a charging circuit unit of the second preferred embodiment of a rechargeable battery according to the present invention.

FIG. 5 is a schematic circuit block diagram of the charging circuit unit 600 of the second preferred embodiment of this invention. The charging circuit unit 600 is generally similar to that of the first preferred embodiment, except for the addition of an amplifying transistor 641 which interconnects cascadingly the control transistor 622 and the switch unit 64 to permit the supply of a larger charging current to the secondary storage cell 50.

Figure 6:
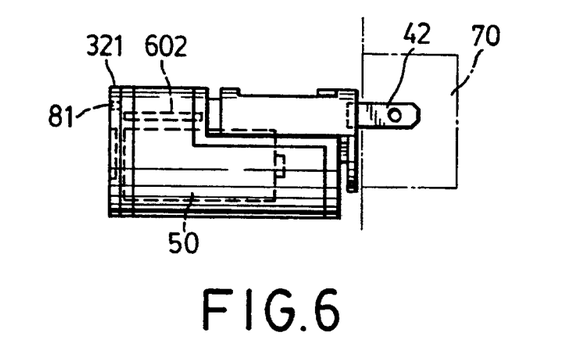
FIG. 6 illustrates the third preferred embodiment of a rechargeable battery according to the present invention when connected to an electrical outlet.
Figure 7:
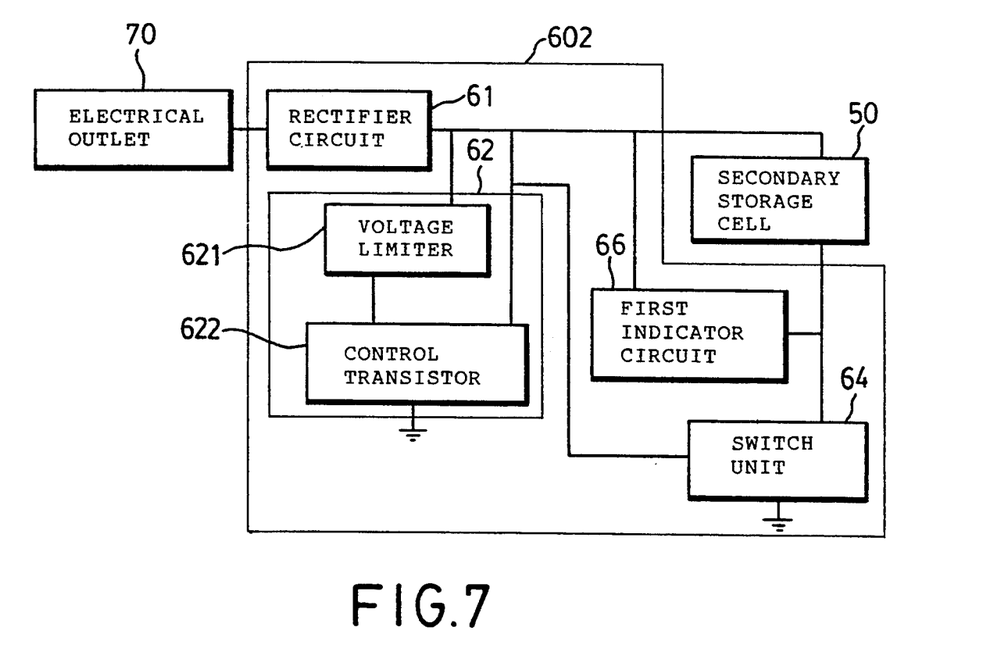
FIG. 7 is a schematic circuit block diagram of a charging circuit unit of the third preferred embodiment.

FIG. 6 illustrates the third preferred embodiment of a rechargeable battery according to the present invention. The third preferred embodiment is substantially similar to the first preferred embodiment, except that the charging circuit unit 602 of the third preferred embodiment, as shown in Figure 7, further comprises a first indicator circuit 66 which is connected to the rectifier circuit 61 and to the positive and negative battery terminals for generating a visual signal when charging of the secondary storage cell 50 is taking place. In this embodiment, the first indicator circuit 66 includes a light emitting diode 81 which is visible through a window formed in the bottom cover 321.

Figure 8:
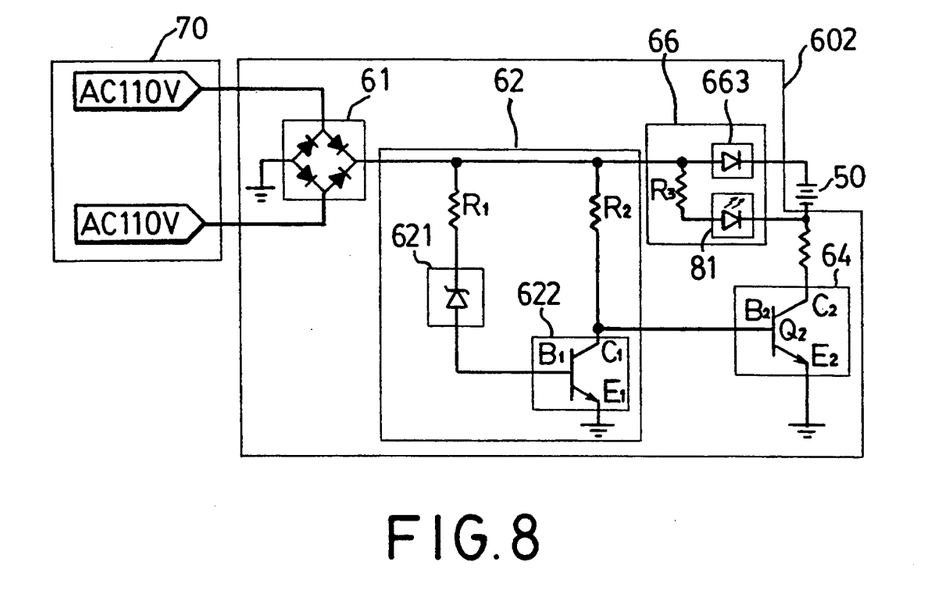
FIG. 8 is a schematic electrical circuit diagram of the charging circuit unit shown in FIG. 7.

Referring to FIG. 8, the light emitting diode 81 of the first indicator circuit 66 is connected in series with a resistor R3. The light emitting diode 81 and the resistor R3 are then connected to the rectifier circuit 61 and the negative battery terminal. Thus, when charging current flows through the secondary storage cell 50, current similarly flows through the light emitting diode 81 to cause the latter to emit light. A diode 663 interconnects the light emitting diode 81 and the positive battery terminal to prevent the latter from supplying charging current to the light emitting diode 81 when charging of the secondary storage cell 50 is terminated.

Figure 9:
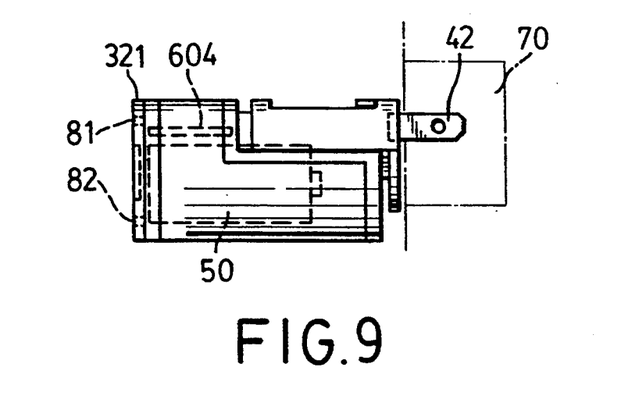
FIG. 9 illustrates the fourth preferred embodiment of a rechargeable battery according to the present invention when connected to an electrical outlet.
Figure 10:
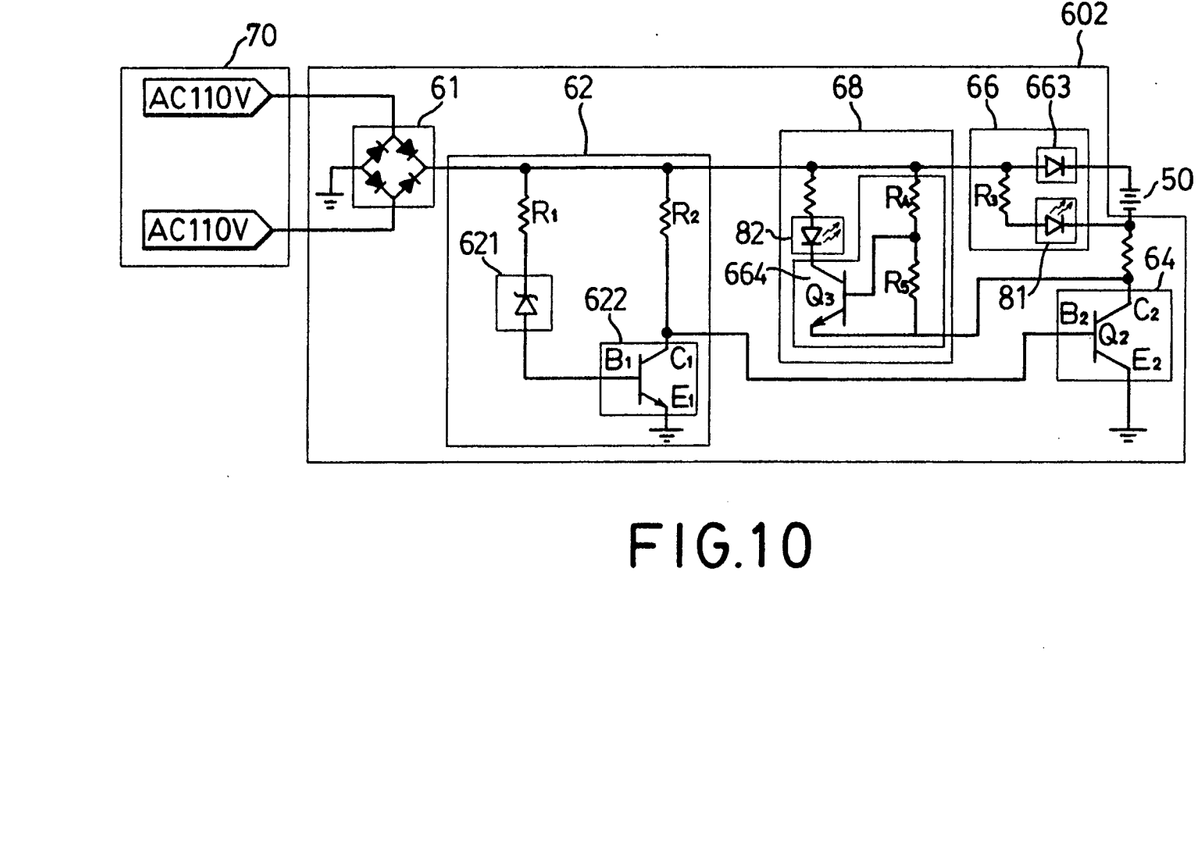
FIG. 10 is a schematic electrical circuit diagram of a charging circuit unit of the fourth preferred embodiment.

FIG. 9 illustrates the fourth preferred embodiment of a rechargeable battery according to the present invention. The fourth preferred embodiment is substantially similar to the third preferred embodiment, except that the charging circuit unit 604 of the fourth preferred embodiment, as shown in FIG. 10, further comprises a second indicator circuit 68 which is similarly connected to the rectifier circuit 61 and the positive and negative battery terminals for generating a visual signal when the secondary storage cell 50 has been fully charged. In this embodiment, the second indicator circuit 68 includes a light emitting diode 82 which is visible through another window formed in the bottom cover 321.

Referring to FIG. 10, the light emitting diode 82 is connected to a light switch unit 664. In this embodiment, the switch unit 664 includes a pair of resistors R4, R5 connected in series across the secondary storage cell 50, and a switching transistor Q3 having base and emitter terminals connected across the resistor R5. The resistance values of the resistors R4, R5 are chosen such that, when the voltage across the secondary storage cell 50 reaches a predetermined maximum value which indicates that the secondary storage cell 50 has been fully charged, the voltage across the resistor R5 is sufficient (approximately 0.7 volts) to cause the switch unit 664 to conduct, thereby permitting the flow of current through the light emitting diode 82 to enable the latter to emit light.

Some of the advantages and characterizing features of the rechargeable battery of the present invention are as follows:

1. Since the battery housing 30 is in the form of a standard cylindrical battery configuration, the rechargeable battery of the present invention can be used to drive a battery-operated device directly. Alternatively, if a smaller battery is required, the secondary storage cell 50 may be removed from the battery housing 30 to drive the battery-operated device.
2. The rechargeable battery can be connected directly to a 110 volt or 220 volt power line in order to charge the same. No external battery charger is required.
3. The rechargeable battery is capable of generating visual signals when charging of the secondary storage cell is taking place and when the secondary storage cell has been fully charged.
4. The charging circuit unit of the rechargeable battery has a simple construction.
5. The rechargeable battery can be easily and conveniently assembled.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A rechargeable battery, comprising:
   a hollow battery housing having a top end provided with a positive battery terminal and a bottom end provided with a negative battery terminal, said battery housing further having a surrounding wall that confines a receiving space and a longitudinally extending partition wall that divides said receiving space into a cell receiving space and a prong receiving space, said top end being formed with a pair of prong holes, said surrounding wall being formed with a longitudinally extending slot, said prong holes and said slot permitting access into said prong receiving space;
   a prong unit including a prong base disposed slidably in said prong receiving space, a pair of prongs connected at one end to said prong base, and a slide button extending through said slot in said surrounding wall and connected to said prong base, said slide button being operable manually to move said prongs selectively between a first position, wherein said prongs are fully retracted in said prong receiving space, and a second position, wherein said prongs extend out of said prong receiving space via said prong holes at said top end of said battery housing for connection to an electrical outlet;

a secondary storage cell received in said cell receiving space and having a positive cell terminal connected electrically to said positive battery terminal and a negative cell terminal connected electrically to said negative battery terminal; and a charging circuit unit disposed in said cell receiving space, said charging circuit unit interconnecting electrically said prongs and said positive and negative battery terminals to permit charging of said secondary storage cell when said prongs are connected to the electrical outlet.

2. The rechargeable battery as claimed in claim 1, wherein said partition wall has a longitudinal wall section with a top end, a bottom end and opposite longitudinal edges, said battery housing including a main housing part with top and bottom ends and a peripheral wall, said top end of said main housing part having said positive battery terminal provided thereat, said bottom end of said main housing part constituting said bottom end of said battery housing, said top end and said longitudinal edges of said longitudinal wall section of said partition wall being connected integrally and respectively to said top end and said peripheral wall of said main housing part, said partition wall further having a transverse wall section that extends from said bottom end of said longitudinal wall section and that is connected integrally to said peripheral wall of said main housing part, said main housing part and said partition wall cooperatively confining said cell receiving space, said battery housing further having a second housing part which cooperates with said partition wall to confine said prong receiving space, said second housing part having a horizontal section that engages said top end of said main housing part and that has said prong holes formed therethrough and a vertical section that has said slot formed therethrough, said horizontal section of said second housing part and said top end of said main housing part constituting said top end of said battery housing, said vertical section of said second housing part and said peripheral wall of said main housing part constituting said surrounding wall of said battery housing.

3. The rechargeable battery as claimed in claim 2, wherein said longitudinal wall section of said partition wall has a spaced pair of longitudinal guide rails for engaging slidably two ends of said prong base.

4. The rechargeable battery as claimed in claim 3, wherein said top end of said main housing part has a top surface that is formed with a U-shaped retaining groove around said positive battery terminal, said horizontal section of said second housing part having a retaining portion received in said retaining groove and formed with a through-hole to permit passage of said positive battery terminal therethrough.

5. The rechargeable battery as claimed in claim 4, wherein said transverse wall section of said partition wall is formed with a retaining slot, said vertical section of said second housing part being formed with a downwardly extending retaining plate which engages said retaining slot to connect slidably said second housing part to said main housing part, said second housing part being slidable in a longitudinal direction relative to said main housing part to enable said horizontal section to selectively conceal said positive battery terminal when connecting said prongs to the electrical outlet.

6. The rechargeable battery as claimed in claim 1, wherein said charging circuit unit comprises:

a rectifier circuit which is connected electrically to said prongs and which generates a rectified output when said prongs are connected to the electrical outlet;

a switch unit which interconnects said rectifier circuit and said positive and negative battery terminals to enable said rectifier circuit to charge said secondary storage cell; and a switch control circuit connected to said rectifier circuit and said switch unit, said switch control circuit disabling said switch unit when said rectified output exceeds a predetermined value to terminate charging of said secondary storage cell.

7. The rechargeable battery as claimed in claim 6, wherein said switch unit includes a switching transistor.

8. The rechargeable battery as claimed in claim 7, wherein said switch control circuit comprises a control transistor having collector and emitter terminals connected to base and emitter terminals of said switching transistor, and a voltage limiter interconnecting said rectifier circuit and a base terminal of said control transistor to cause said control transistor to conduct so as to disable said switching transistor when said rectified output exceeds the predetermined value.

9. The rechargeable battery as claimed in claim 8, wherein said voltage limiter is a zener diode.

10. The rechargeable battery as claimed in claim 9, wherein said charging circuit unit further comprises an amplifying transistor interconnecting cascadingly said control transistor and said switching transistor.

11. The rechargeable battery as claimed in claim 8, wherein said charging circuit unit further comprises an indicator circuit connected to said rectifier circuit and said positive and negative battery terminals for generating a visual signal when charging of said secondary storage cell is taking place.

12. The rechargeable battery as claimed in claim 11, wherein said indicator circuit includes a light emitting unit connected to said rectifier circuit and to one of said positive and negative battery terminals, and a diode which interconnects said light emitting unit and the other one of said positive and negative battery terminals to prevent said secondary storage cell from supplying current to said light emitting unit when charging of said secondary storage cell is terminated.

13. The rechargeable battery as claimed in claim 12, wherein said light emitting unit includes a light emitting diode.

14. The rechargeable battery as claimed in claim 12, wherein said battery housing is formed with a window to permit viewing of said light emitting unit.

15. The rechargeable battery as claimed in claim 8, wherein said charging circuit unit further comprises an indicator circuit connected to said rectifier circuit and said positive and negative battery terminals for generating a visual signal when said secondary storage cell has been fully charged.

16. The rechargeable battery as claimed in claim 15, wherein said indicator circuit includes a light emitting unit and a light switch unit which connects said light emitting unit and said rectifier circuit when voltage across said secondary storage cell reaches a predetermined maximum value to indicate that said secondary storage cell has been fully charged.

17. The rechargeable battery as claimed in claim 16, wherein said light switch unit includes a pair of resistors connected in series across said secondary storage cell and a switching transistor having base and emitter terminals connected across one of said resistors.

18. The rechargeable battery as claimed in claim 17, wherein said light emitting unit includes a light emitting diode.

19. The rechargeable battery as claimed in claim 17, wherein said battery housing is formed with a window to permit viewing of said light emitting unit.

* * * * *